Patented June 3, 1930

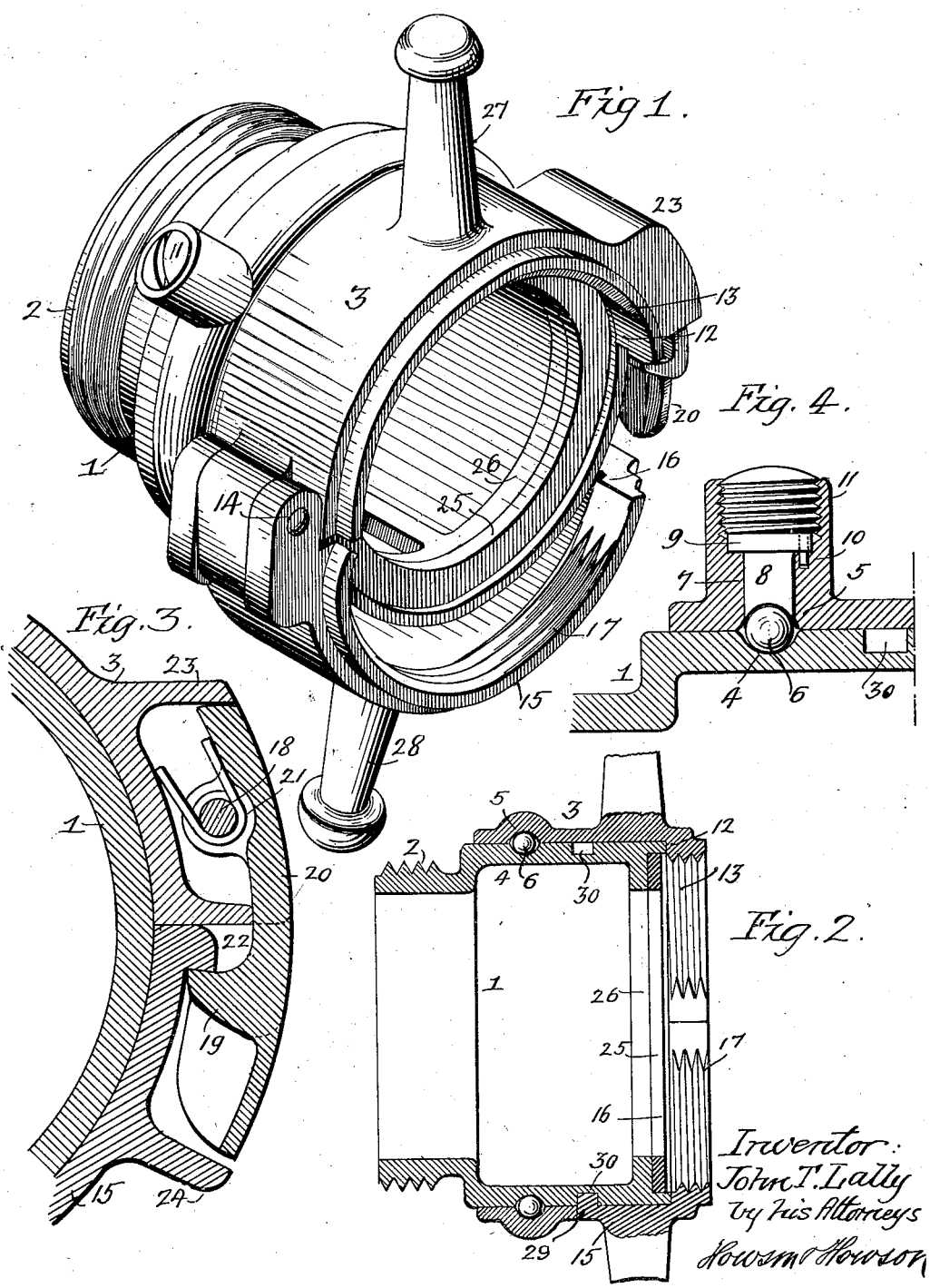

1,762,065

UNITED STATES PATENT OFFICE

JOHN T. LALLY, OF WILMINGTON, DELAWARE

COUPLING FOR SUCTION HOSE

Application filed May 18, 1928. Serial No. 278,847.

My invention relates to certain improvements in hose couplings, particularly of the type used in connection with the suction hose of fire apparatus.

The object of my invention is to so construct the coupling that it can be quickly applied to the nozzle of a fire-plug or hydrant, and when so coupled it can be turned to make a tight joint.

The invention also relates to certain details of construction which will be fully described hereinafter.

In the accompanying drawing:

Fig. 1 is a perspective view of my improved coupling;

Fig. 2 is a longitudinal sectional view;

Fig. 3 is a sectional view showing the spring latch; and

Fig. 4 is a sectional view through the ball-race.

The body 1 of the coupling has a screw-thread 2 at one end to be coupled to the section of a coupling attached to a hose. Mounted on the body portion is a swiveled head 3.

The body 1 and the main portion of the swiveled head 3 have race-ways 4 and 5, respectively, in which are a series of balls 6.

In assembling the two parts, the two race-ways are brought into alignment; the balls are inserted through an opening 7; and when all the balls are in place, a plug 8 is inserted in the opening, the inner end of the plug being shaped to correspond to the race-way 5.

The plug has a head 9, and a pin 10 on the head extends into a hole in the swiveled head, which prevents the plug from turning, a screw-plug 11 then being inserted into the opening, thus holding the plug 8 in position.

The swiveled head 3 has a shoulder 12 which rests against the end of the body 1, and on the shouldered portion of the head 3 is an internal segmental screw-thread 13.

Pivoted to the swiveled head 3 at 14 is a segmental section 15 having a shoulder 16 and an internal screw-thread 17. These two parts align with similar parts on the main portion of the swiveled head 3, so that when the segmental section is coupled to the main portion, the shoulders and screw-threads of the two parts will be in alignment as shown in Fig. 2.

In order to retain the parts in the closed position, a latch 20 is used, which is mounted on a pin 18 on one section and has an undercut hook 19 which is arranged to engage a like projection 22 on the other section.

A spring 21 encircles the pivot pin 18, one end of the spring bearing against the heel of the latch, and the other end bearing against the wall of the part to which the latch is pivoted.

The body of the latch is enclosed within a box-like projection 23 formed on the head 3 to which the latch is pivoted, while the outer end of the latch is protected by a lug 24 on the segmental section.

The back of the latch is flush with the box-like projection and the lug, so that it cannot be accidentally released. The space between the projection and the lug is sufficient to allow access to the latch, when it is necessary to release the segmental section.

Located in the swiveled head 3 is a gasket 25 of rubber, leather, or other suitable material. This gasket rests against an internal flange 26 on the swiveled section and fits against the end of the plug nozzle when the coupling is applied to a plug.

On the swiveled head 3 is a projecting hand-hold 27, and on the segmental section 15 is a hand-hold 28. The hand-holds are not only used to close the coupling but are also used to turn the swiveled head 3 on the threaded nozzle of the plug to make a tight joint.

In order to prevent the segmental section 15 of the swiveled head 3 from being strained, a segmental rib 29 is formed on the segmental section 15, which rib enters an annular groove 30 in the body 1 when the segmental section 15 is in the closed position as shown in Fig. 2.

The coupling can be quickly attached to the nozzle of a plug and the head turned slightly to make a tight joint; and the coupling can be readily detached by releasing the latch, when the segmental section will turn on its pivot and release the coupling. The ball-bearing makes it possible to screw the head onto the nozzle of the plug, insuring a tight joint.

I claim:

The combination in hose coupling, of a body portion; a head swiveled thereon and having a projecting threaded segmental portion; a movable threaded segmental portion pivoted to the head at one side thereof and arranged to close against the projecting segmental portion of the head; a spring-latch pivoted to the opposite side of the head and having a hook; and a projection at the end of the movable segmental portion with which the hook of the latch engages, the head having a box-like structure enclosing the body of the latch, and the movable segmental section having a lug which protects the outer end of the latch.

JOHN T. LALLY.